United States Patent

[11] 3,630,506

| [72] | Inventors | Franz Plasser;<br>Josef Theurer, both of Johannesgasse 3,<br>1010 Vienna, Austria |
|---|---|---|
| [21] | Appl. No. | 877,194 |
| [22] | Filed | Nov. 13, 1969 |
| [45] | Patented | Dec. 28, 1971 |
| [32] | Priority | Nov. 26, 1968 |
| [33] | | Austria |
| [31] | | A 11,506/68 |

[54] RAIL-CUTTING MACHINE
7 Claims, 4 Drawing Figs.

[52] U.S. Cl. .................................................. 266/23 HH, 266/23 K
[51] Int. Cl. ................................................... B23k 7/04
[50] Field of Search ....................................... 266/23 HH, 23 K, 23 L, 23 NN; 33/25 C, 25 E, 27; 51/178, 241 LG; 219/53, 54

[56] References Cited

UNITED STATES PATENTS

| 1,691,007 | 11/1928 | Crowe et al. | 266/23 HH |
| 2,484,897 | 10/1949 | Lytle | 266/23 K UX |
| 1,096,095 | 5/1914 | Bucknam | 266/23 HH |
| 1,546,128 | 7/1925 | Hamer | 266/23 HH UX |
| 1,658,811 | 2/1928 | Martini | 266/23 HH |
| 2,053,890 | 9/1936 | Anderson | 266/23 K |
| 2,271,613 | 2/1942 | Babcock et al. | 266/23 K |
| 2,601,383 | 6/1952 | George | 266/23 K |

FOREIGN PATENTS

| 840,937 | 1/1939 | France | 266/23 HH |

Primary Examiner—Frank T. Yost
Attorney—Kurt Kelman

ABSTRACT: In a rail-cutting machine, a blowtorch is so guided for pivotal movement in relation to the rail in a plane transverse thereof that the blowtorch remains at a constant distance from the rail while moving through a convex cutting path corresponding to the concave section defined in this plane by the rail base, web and head.

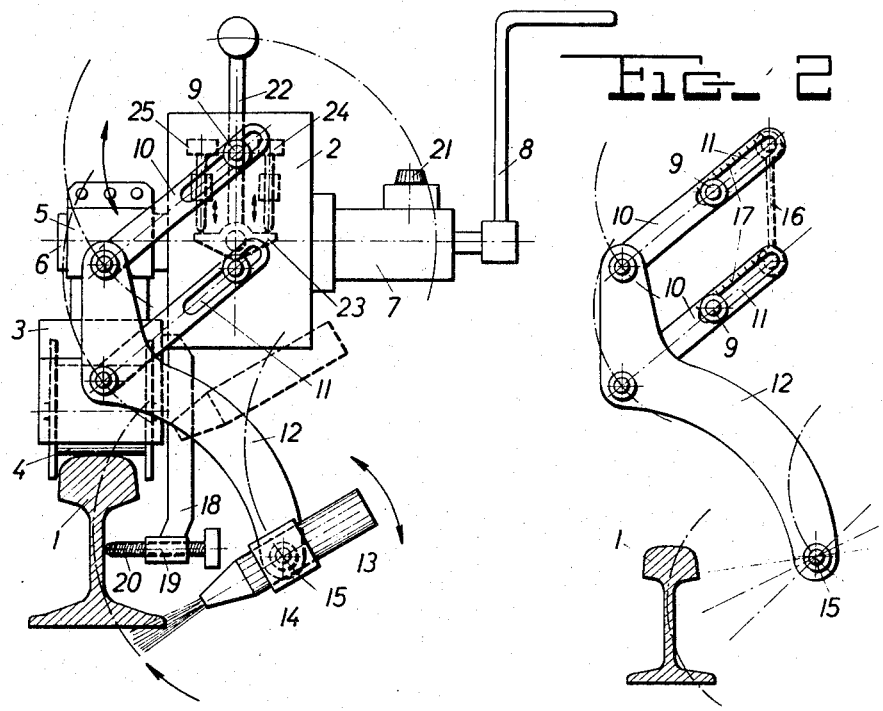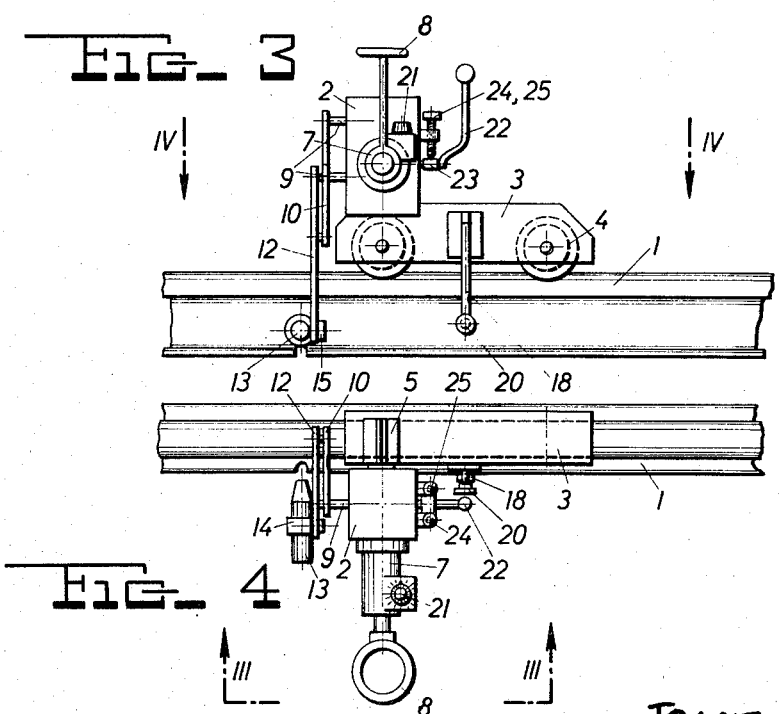

RAIL-CUTTING MACHINE

BACKGROUND AND SUMMARY OF THE INVENTION

The present invention relates to a machine for cutting elongated rolled metal elements, such as rails, which define a concave section in a cutting plane transverse to the element.

The base, web and head of a rail define such a concave section or profile, and the term "rail" is used throughout the specification and claims to cover such like elements.

Portable cutting machines of this type are known, wherein a cutting blowtorch is mounted in a holder and its cutting motion is so controlled that the torch remains at a substantially constant distance from the surface in this section while the cutting path of the torch in the cutting plane is limited and the velocity of the cutting motion is variable in accordance with the thickness of succeeding portions of the element to be cut along this path.

Such machines have been used for cutting rolled metal elements, such as billets, of cylindrical or rectangular cross section. Spring drives have been used for moving the blowtorch in such machines, and the drives may be actuated by a lever. The velocity of the torch movement during the cutting operation is controlled, for instance, by throttle valve means in a hydraulic control so that the cutting speed may be adjusted to the gage of the portion of the element being cut in succeeding stages of the operation. Stops are mounted in the path of the actuating lever to limit the cutting path of the torch.

It is the primary object of this invention to provide a portable machine of this general type which is adapted to cutting elongated elements of a concave section or profile in the cutting plane, such as I-, C- or L-profiles, and so to control the cutting path that it follows the profile closely whereby sharp cuts are effectively and rapidly performed with a simple tool.

It is a further object of the invention to provide such a machine with an operating unit of great simplicity and sturdiness, which comprises a minimum of parts, to make it relatively light and portable or manually movable along a rail while no special skill is required either for its operation or maintenance.

Since such a machine is particularly useful for cutting rails, it will be described herein in connection with such use. It will be obvious to those skilled in the art that it may also be used for cutting similar elements with concave profiles.

The above and other objects are accomplished in accordance with the present invention with a machine which comprises a rail-cutting blowtorch, a holder for the blowtorch, and guide means mounted on the machine for pivotal movement in respect thereto and connected to the blowtorch holder for guiding the same through a cutting path. Control means is provided for pivoting the guide means so that the blowtorch moves through a cutting path in a plane transverse of the rail elongation and which is at a substantially constant distance from the rail surface. The rail base, web and head define a concave section in the transverse plane and the cutting path is convex in correspondence with the concave section. Stop means limits the pivoting movement of the guide means and thus limits the cutting path of the blowtorch, and means is provided for varying the velocity of the pivoting movement.

In the preferred embodiment herein described and illustrated, the guide means includes two guide rods linked together in a parallelogram motion transmitting device extending in a plane parallel to the cutting plane. The blowtorch and guide means are mounted laterally adjacent the rail surface in the concave transverse section.

The radius of the arcuate cutting path may be changed to conform to the profile of the element to be cut by adjustably mounting the guide rods with elongated guide slots on guide pins which guide and move the rods through the pivoting movement. For instance, if the arcuate cutting path is to be other than circular, the guide slots in the guide rods may be curved instead of straight or a secondary component may be superimposed upon the motion by mounting at least one of the guide pins in a slot permitting this guide pin to execute a motion of its own while it guides and moves the guide rod attached thereto. Camming means of any desired type may be used to produce arcuate paths of any desired configuration conforming to a selected profile to be cut.

Preferably, the blowtorch is mounted at the lower end of the holder for pivotal movement in the transverse cutting plane whereby the angle of the blowtorch in respect of the rail may be changed at will. While the blowtorch may remain in a fixed adjusted position on the holder during the cutting operation, a control responsive to the movement of the blowtorch along the cutting path may adjust the angular position of the torch during the torch movement.

BRIEF DESCRIPTION OF DRAWING

The above and other objects, advantages and features of this invention will become more apparent by reference to the following detailed description of a now preferred embodiment, taken in conjunction with the accompanying drawing wherein;

FIG. 1 is a front view of the machine;

FIG. 2 is a similar view of one structural detail of the machine;

FIG. 3 is a side view of the machine on a smaller scale, taken along line III—III of FIG. 4; and FIG. 4 is a top view of the machine, viewed in the direction of arrows IV—IV of FIG. 3.

DETAILED DESCRIPTION

The illustrated machine includes a unit supported and guided on rail 1 by a running gear 3 which has rimmed wheels 4 engaging the rail head. A crossbeam 6 carries a collar 5, which mounts the running gear on the crossbeam, and the unit including housing 2 and housing 7. Handle 8 is mounted on housing 7 at the end of the machine opposite to rail 1 to enable the entire machine to be carried or manually moved along the rail.

The housing 2 has a front face extending vertically transversely of the rail on which are mounted a pair of guide pins or bolts 9, 9 serving to guide the guide rods 10, 10 and to transmit the pivoting movement of the actuating lever 22 to the guide rods, the actuating lever being mounted on the rear face of housing 2. The guide rods define elongated guide slots 11, 11 which are straight in the illustrated embodiment but may be curved if an arcuate path other than circular is desired. The guide pins project through the guide slots and distance of the guide rods from the rail may be adjusted by changing the position of the pins in the slots, which adjusted position may be temporarily fixed by suitable nuts mounted on the pins. In the illustrated embodiment, the guide rods 10, 10 are linked together in a parallelogram motion transmitting device extending in a plane parallel to the cutting plane, the one end of the guide rods opposite the guide slots being linked to holder 12 of blowtorch 13. As shown in FIG. 2, the other ends of the guide rods may be linked together by connecting rod 16 which stabilizes the guiding motion. This may be particularly useful and desirable if one of the guide rods is freely movably mounted on its guide pin.

A mounting ring 14 is rotatably mounted on the pivot pin 15 at the end of holder 12 opposite the holder end linked to the guide rods, the pin extending in the direction of the rail. The rail-cutting blowtorch 13 is held in ring 14 for pivotal movement in a plane transverse to the rail whereby the angle of the blowtorch in respect of the rail may be changed for most advantageous location of the torch tip in relation to the rail portion to be cut.

Upon pivoting of actuating lever 22 along the arcuate path indicated in dash-doted lines in FIG. 1, the one ends of the guide rods move in the opposite circularly arcuate paths, taking along the blowtorch holder 12 to move the blowtorch 13 in a corresponding concave path in respect of the concave profile of the rail, all as indicated in dash-dotted lines in FIG. 1.

As can be seen in FIG. 2, a scale 17 may be arranged along at least one of the guide slots 11 so that the guide pin 9 may be adjusted on the slot in accordance with the reading of the scale to adjust the radius of the cutting path of the torch in dependence on the concavity of the profile of the rail to be cut.

The guide pins 9, 9 and the actuating lever 22 constitute control means for pivoting the guide rods so that the blowtorch moves through the arcuate, convex cutting path in a plane transverse to the rail at a substantially constant distance from the rail surface. The pivotal movement of lever 22 is limited by adjustable stops 24, 25 to limit the cutting path of the blowtorch. A crosspiece 23 is fixedly attached to the lower end of the actuating lever and the laterally extending arms of the crosspiece are arranged for cooperation with the adjustable stops 24, 25, pivoting of the lever in a plane transverse to the rail being limited when a stop engages a cooperating crosspiece arm. When the stops are adjusted into the position shown in FIG. 1, i.e. when they both engage the crosspiece while it is in a horizontal position, the actuating lever is retained in a rest position. When it is desired to operate the machine, at least one of the stops is lifted a predetermined distance to permit pivoting of the lever and corresponding movement of the guide rods 10, holder 12 and blowtorch 13 through a desired cutting path. This drive is conventional and forms part of the present invention only inasmuch as it is combined with the machine herein claimed.

The housing 7 is connected to housing 2 and carries a control knob 21 for nonillustrated throttle valve means controlling the flow of hydraulic oil in housings 7 and 2 for varying the velocity of the pivoting movement of the lever and associated guide pins. The desired operating speed may be set by an operator means of knob 21.

The entire machine is braced against the rail by a bracing element 18 which is mounted on running gear 3 and has a setscrew 20 extending into lateral contact with the rail. The setscrew is guided in nut 19 extending vertically to the web of the rail and may be moved in the nut to adjust the angular position of the unit and to stabilize the unit in respect of the rail.

The operation of the machine will be obvious from the above description of its structure. After the rail has been preheated at the point where it is to be cut, the portable machine is manually moved to this point by handle 8 and fixed in the desired position by means of setscrew 20 brought into contacting engagement with the rail web. The torch is then laterally adjusted in respect of the rail by moving the guide rods along guide pins 9 until the pins register with a desired point on scale 17, which depends on the profile of the rail. Further adjustment in dependence on the size of the rail and the nature of the profile is made by adjusting the stops 24, 15 which determine the length of the cutting path. The actuating lever 22 is then operated to produce the cutting motion whose speed is regulated by operating knob 21, the speed being changed as the torch passes by the rail base, then the rail web and finally the railhead whose gages differ from each other.

All of the controls may be automated, if desired, and other modifications and variations may readily occur to those skilled in the art without departing from the spirit and scope of the invention.

We claim:

1. A machine for cutting a rail in a plane transverse of the rail elongation, the rail having a base, a web and a head defining a concave section in said plane, comprising
   1. a rail-cutting blowtorch;
   2. a holder for the blowtorch;
   3. two guide rods linked together in a parallelogram motion-transmitting device extending in a plane parallel to the cutting plane and mounted on the machine for pivotal movement in respect thereto and connected to the blowtorch holder, the blowtorch and the guide rods being mounted laterally adjacent the rail surface in the concave transverse section;
   4. control means for pivoting the guide rods so that the blowtorch moves through a cutting path in said plane which is at a substantially constant distance from the rail surface in said section and the cutting path being convex in correspondence to said concave section;
   5. stop means for limiting the pivoting movement of the guide rods and thus to limit the cutting path of the blowtorch; and
   6. means for varying the velocity of the pivoting movement.

2. The machine of claim 1, wherein the guide rods define elongated guide slots, and guide pins are mounted on the machine and are adjustably arranged in the guide slots for guiding and moving the guide rods through the pivoting movement.

3. The machine of claim 1, further comprising housing means for the control means, the stop means and the velocity varying means, the guide rods being pivotally mounted on the housing means whereby all of said means constitute a unit, and means for supporting and guiding said unit on the rail.

4. The machine of claim 3, wherein the unit supporting and guiding means is a running gear mounted on the rail, said running gear including rimmed wheels engaging the rail.

5. The machine of claim 4, further comprising a bracing element mounted on the running gear and extending into lateral contact with the rail.

6. The machine of claim 5, further comprising means for adjusting the position of the bracing element in respect of the rail whereby the angular position of the unit in said plane may be varied.

7. The machine of claim 6, wherein said position adjusting means includes a setting screw extending transversely of the rail and into contact with the rail web.

* * * * *